May 1, 1923.  1,453,566

E. G. JEFFRIES

TIRE HOLDER

Filed July 1, 1921   2 Sheets-Sheet 1

WITNESSES

INVENTOR
E. G. JEFFRIES
BY
ATTORNEYS

May 1, 1923.
E. G. JEFFRIES
TIRE HOLDER
Filed July 1, 1921
1,453,566
2 Sheets-Sheet 2
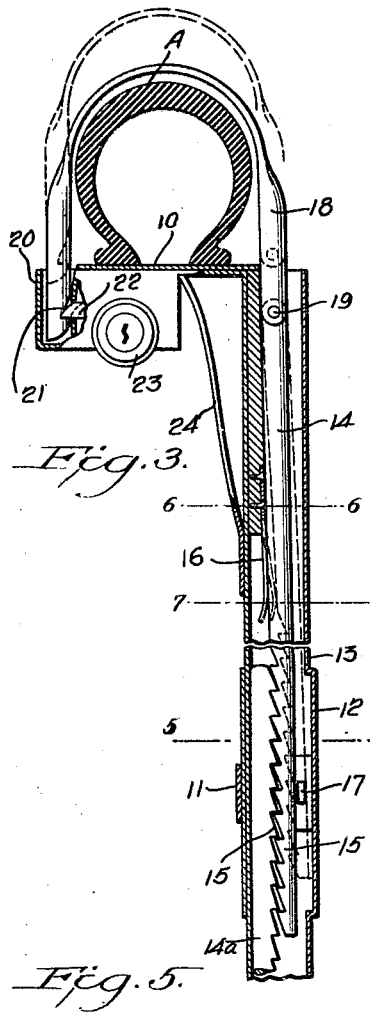
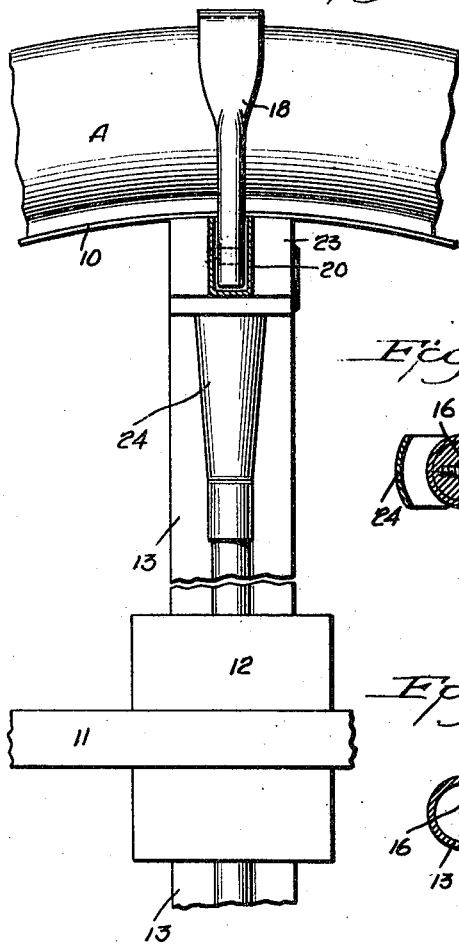
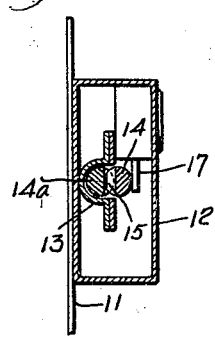
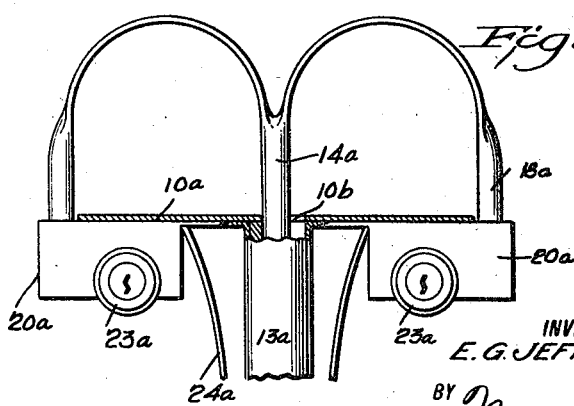
WITNESSES
INVENTOR
E. G. JEFFRIES
BY
ATTORNEYS Patented May 1, 1923.

1,453,566

UNITED STATES PATENT OFFICE.

ELIJAH GORDON JEFFRIES, OF TACOMA, WASHINGTON.

TIRE HOLDER.

Application filed July 1, 1921. Serial No. 481,837.

*To all whom it may concern:*

Be it known that I, ELIJAH G. JEFFRIES, a citizen of the United States, and a resident of Tacoma, in the county of Pierce and State of Washington, have invented a new and Improved Tire Holder, of which the following is a description.

My invention relates to means to hold a spare tire or tires on an automobile and has for its general object to provide a device for the indicated purpose, whereby the tire may be securely locked against its unauthorized removal.

A more specific object of the invention is to provide a holder reflecting practical considerations with respect to simplicity of construction and convenience in securing and removal of the tire.

Reference is to be had to the accompanying drawings forming a part of this specification, it being understood that the drawings are merely illustrative of two examples of the invention.

Figure 3 is an enlarged vertical section through a portion of the holder and tire;

Figure 4 is an elevation partly in section of the parts shown in Figure 3;

Figure 2:
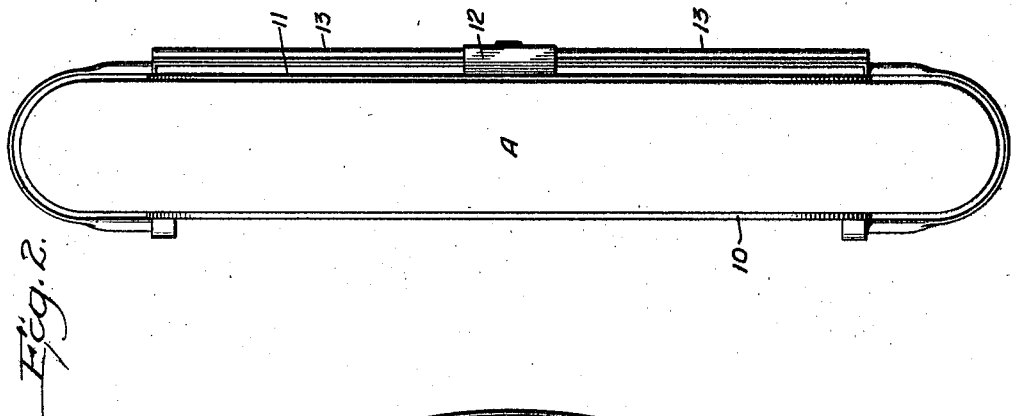
Figure 2 is an edge view.
Figure 1:
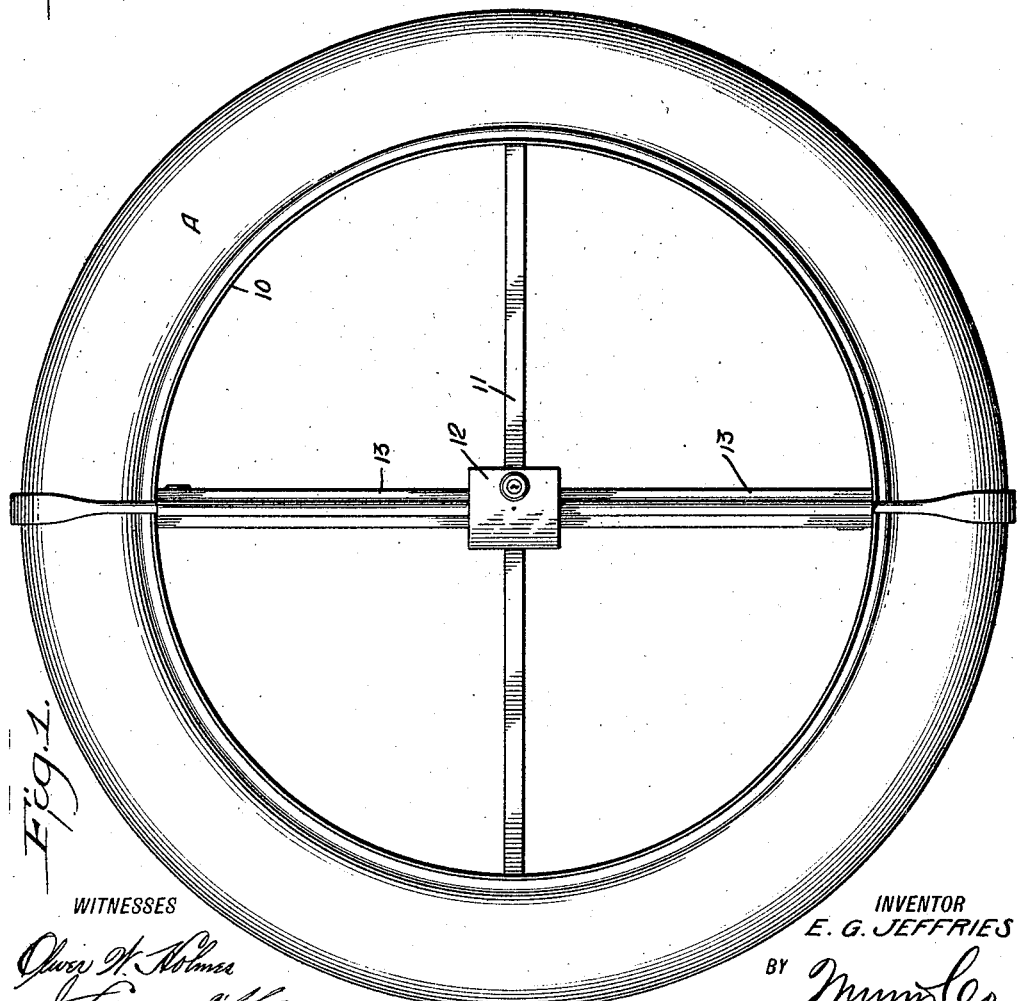
Figure 1 is an elevation of a tire holder embodying my invention illustrating a tire held thereon.

Figures 5, 6 and 7 are sections respectively on the lines 5—5, 6—6 and 7—7, of Figure 3;

Figure 8 is a sectional edge view illustrating the holder formed to receive two tires.

In carrying out my invention in accordance with the illustrated example, I provide a rim 10 having radial spokes or braces 11 at the intersection of which is a lock case 12. Certain of the braces or spokes have casings 13 radially disposed in which are accommodated the shanks 14, 14$^a$ of tire clamps, said shanks overlapping and formed at their opposed overlapping faces with ratchet teeth 15 so that the shanks may interengage each other. A plate spring 16 is disposed in one of the casings 13 and bears against the adjacent shank 14 tending to force the same away from the other shank 14$^a$ to disengage the ratchet teeth of the shanks. To hold the shanks in engagement a key-controlled lock bolt 17 may be projected against the back of the shank 14 to prevent the separation of the shanks by the spring 16.

The shanks 14, 14$^a$ are adapted to have telescoping movement in the casings 13 and the outer clamping end 18 of each is of hook form adapted to arch over the tire A when the latter is disposed on the rim 10. The clamping ends 18 are pivoted as at 19 to swing transversely to the plane of the holder. The shanks may be moved into the casings 13 to dispose the pivots 19 within the casings and thereby prevent swinging of the clamping ends 18 or said shanks may be moved outwardly in the casings to position the pivots 19 outside of the casings to permit swinging of the clamp ends 18 after the bolt 17 has been withdrawn and the spring 16 permitted to force the shanks apart.

The terminal of each hooked clamping end 18 is adapted to enter a socket 20 provided on the rim 10 in association with a lock 23, the lock bolt 22 of which is adapted to be projected into a notch 21 adjacent to an end of the clamping end 18.

The rim 10 is connected with the casings 13 by braces 24 in practice.

In the form shown in Figure 8, the rim presents two tire bases 10$^a$, 10$^b$, each disposed on each side of the medial plane of the rim. A single shank 14$^a$ carries a pair of rigid clamp ends 18$^a$ arching over said bases and adapted to lock therein the tires placed on the rim. The shank 14$^a$ telescopes in the casing 13$^a$ in the same manner as in casing 13 of the previous figures. To each of the bases 10$^a$, 10$^b$, sockets 20$^a$ are secured, said sockets being associated with lock casings 23$^a$ and both are strengthened by the braces 24$^a$ corresponding with the braces 24.

I would state in conclusion that while the illustrated examples constitute practical embodiments of my invention, I do not limit myself strictly to the exact details herein illustrated, since manifestly the same can be considerably varied without departure from the spirit of the invention as defined in the appended claims.

Having thus described my invention, I claim:

1. A tire holder of the class described, including a rim adapted to receive a tire, clamps having radially disposed shanks movable longitudinally relatively to each other, the respective shanks overlapping, means to lock the shanks against relative movement, said shanks having terminal clamping members in hooked form, sockets on the rim in which the ends of the clamping terminals are receivable, and means to lock the said ends in the sockets.

2. A tire holder including a rim adapted to receive a tire, clamps having shanks radially disposed and movable longitudinally relatively to each other, housings receiving said shanks and enclosing the shanks, clamping terminals of hooked form pivoted on said shanks to swing laterally when the shanks are moved to the outer positions, the pivots of the clamping terminals lying within the housings in the inner position of the shanks, and means to lock the shanks against relative movements.

ELIJAH GORDON JEFFRIES.